United States Patent Office 3,268,457
Patented August 23, 1966

3,268,457
METHOD OF CREATING ELECTRICALLY
SEMICONDUCTING DIAMOND
Armando A. Giardini, New Shrewsbury, and John E. Tydings, Keyport, N.J., assignors to the United States of America as represented by the Secretary of the Army
No Drawing. Filed Apr. 5, 1962, Ser. No. 185,484
4 Claims. (Cl. 252—506)

The invention described herein may be manufactured and used by or for the Government for governmental purposes without the payment of any royalty thereon.

This invention relates to methods for preparing semiconducting diamond, and more particularly, to methods for preparing semiconducting diamond from pure insulating diamond under conditions of high temperature and high pressure.

Methods for making damond under conditions of high pressures and high temperatures have been disclosed in earlier patents issued to H. T. Hall, F. P. Bundy, H. M. Strong, R. H. Wentorf, Jr., H. P. Bovenkerk, etc., of the General Electric Company. In the above processes are described as being catalytic reactions between certain metals, mixtures of metals, metal alloys, metal carbides or metal salts, and carbon of some form other than graphite.

A more recent publication ("The Journal of Chemical Physics," vol. 35, No. 2, August 1961, pp. 383–391, F. P. Bundy, H. P. Bovenkerk, H. M. Strong and R. H. Wentorf, Jr.) refers to the physical chemical purpose of the metallic materials cited above as being that of catalytic solvents.

In our research, is has been found that the mechanism of diamond synthesis under conditions of high pressures and high temperatures can best be described as the solution of carbon in any suitable solvent to a state of supersaturation and thermodynamic instability, followed by decomposition with subsequent recrystallization of the precipitated free carbon. Providing that supersaturation, decomposition and recrystallization are made to occur at temperatures and pressures at which diamond is the thermodynamically stable form of carbon (R. Berman and F. Simon, Z. Elektrochem, vol. 59, p. 333 (1955)) the released carbon may crystallize as diamond; otherwise, the modification known as graphite is formed.

Some metallic carbon solvents studied in the course of this work are platinum, nickel, cobalt, iron, manganese, chromium and tantalum. Their behavior to carbon have been found to fall into general categories; namely, those not prone to form stoichiometric carbon compounds (carbides) and those which do. The first three elements listed fall into the first category of non-carbide formers (that is, being simple carbon solvents), whereas the latter four elements cited readily form stable carbides.

On the basis of diagnostic evidence of residual end products, the mechanism of diamond synthesis can be most directly described in the case of non-carbide forming solvents as being that of simple binary solutions carried through to the point of supersaturation, whereas that for carbide-forming solvents consist of the formation of a sequence of carbon compounds or carbides with increasing carbon contents. The sequence proceeds, in the presence of excess carbon, to the formation of an "ultimate carbide" having the highest possible stoichiometry of carbon. The latter, in the presence of excess undissolved carbon, decomposes to the next lower carbide with the liberation of free carbon atoms which may recrystallize as diamond. As specific examples, sequences which occur in the iron-carbon system and manganese-carbon system, respectively, may be cited:

Iron+carbon→ferrite (a solid solution of iron and carbon)
Ferrite+C→cementite ($Fe_3C$)
Cementite ($Fe_3C$)+C→FeC
FeC+C→$Fe_3C$+diamond The process is continuous through $Fe_3C$+C→FeC;

Manganese+carbon→delta Mn (a solid solution of manganese and carbon)
Delta Mn+C→$Mn_{23}C_6$
$Mn_{23}C_6$+C→$Mn_3C$
$Mn_3C$+C→$Mn_7C_3$
$Mn_7C_3$+C→MnC
MnC+C→$Mn_7C_3$+diamond This process also is made continuous through $Mn_7C_3$+C→MnC The sequences cited above proceed as a function of increasing temperature and time at a pressure sufficiently high for stable diamond formation.

During the course of research directed toward the development of semiconducting synthetic diamond, it has been found that crystals synthesized from solutions of nickel and carbon, cobalt and carbon, mixtures thereof, or environments rich either in nickel or cobalt, invariably contained an internal contamination of the metal element to a greater or lesser degree, depending upon the temperature during crystallization. The presence of contamination can be readily detected through visual discoloration ranging from shades of yellow, green or brown; or more quantitatively by the degree of induced magnetism, analytical optics, or X-ray diffraction analysis.

It has been discovered that diamond synthesized from reactions involving essentially iron and carbon, manganese and carbon, or mixtures thereof, can be made to be colorless, chemically pure, and well crystallized.

It has been found that the cause of differentiation in chemical purity between diamond synthesized from non-carbide forming solvents such as nickel or cobalt and those which form stable carbides is a function of the crystal chemistry of the systems involved.

Specifically, it has been found [1] that nickel and cobalt, either pure or with limited amounts of carbon contained within their respective crystal structures, possess crystal structures which are geometrically very similar to that of diamond and dimensionally almost identical but slightly smaller. On the other hand, of the stable carbide-forming solvents such as iron and manganese, phases present during diamond growth, for example FeC, $Fe_3C$, or MnC and $Mn_7C_3$, respectively, do not possess the close geometrical and dimensional crystal structure relationships to diamond as the aforementioned simple solvents. Neither do the metal elements, whether pure or with limited amounts of dissolved carbon. Where geometrical compatibility does exist, corresponding dimensions exceed those of diamond. In consequence to the structural relationships, it has been found that nickel and cobalt (both containing limited amounts of carbon) are readily and systematically incorporated within diamond as dispersed expitaxial inclusions because of the close geometrical and almost identical (but smaller) dimensional correpondence. The carbide-forming solvents, on the other hand, do not possess this geometrical, and especially dimensional fit. As a consequence, they are not included as expitaxial inclusions during crystallization, but rather are rejected.

It has been observed, however, that limited presence of simple solvents such as nickel, cobalt, platinum or elements such as copper, can be present with carbide-forming solvents with no tendency for expitaxial inclusions ---
[1] "Diamond Synthesis: X-ray and Optical Study of Reaction Products," J. A. Kohn, D. W. Eckart, A. A. Giardini, and J. E. Tydings, GSA Conf., November 1961, Cincinnati, Ohio.

as chemical impurities within diamond providing that they do not exceed an amount which can be readily combined stoichiometrically by the host carbide-forming solvent in a manner which neutralizes structural compatibility to that of diamond. As examples, a manganese-nickel weight percent ratio of 20:1 or manganese-copper ratio of 20:1 may be cited. In some cases, the presence of select secondary metal elements appear to aid the mobility and transport of carbon in diamond synthesis reactions.

The conditions of crystal-chemical "misfit" for environmental constituents as discussed above thus provides the knowledge and basic technology for the synthesis of diamond possessing a chemical purity not found in nature nor otherwise obtainable. The latter capability constitutes a necessary prerequisite for the practical consummation of this disclosure; namely, the creation of semiconducting diamond from chemically pure, electrically insulating diamond.

Without going into detail at this point, it can be stated that pure diamond can be made semiconducting by injection of small quantities (in the order of a few parts per million) of selected elemental impurities into its crystal structure. Requirements generally recognized as of principle importance are the geometrical size of the impurity atoms (or as they are frequently referred to—carriers), their concentration, and their number of valence electrons. Thermally induced diffusion of carrier atoms into crystals at sub-atmospheric, atmospheric and slightly elevated pressures so as to induce desired levels of semiconductivity is an established art (e.g., see U.S. Pat. 2,954,308).

The process described herein is unique in the fact that thermal diffusion of impurities is carried out at very high pressures, of the order of several thousands of atmospheres. It is also unique in that diamonds of high chemical purity are used which are not available other than by synthesis by the knowledge and technology imparted above.

It is an object of this invention to provide a method whereby diamond may be rendered semiconducting.

It is a further object of this invention to provide a method for producing high purity diamond and adding selected impurities under high pressure and temperature to produce semiconducting diamond.

The need for carrying out diffusion processes upon diamond at high pressures and high temperatures to impart semiconducting properties rests upon the following unique properties of this material: (1) due to its high degree of chemical inertness, relatively intense thermal stimulation is required in order to induce chemical reactivity and diffusion of foreign atoms; (2) diamond, being a thermodynamically unstable crystal modification of carbon, tends to revert to the electrically conducting modification, graphite, at measurable rates under thermal stimulation of several hundred degrees; for example, 1000° C. Specific temperature values depend upon the crystal and chemical perfection of the specimen. It has been found that at high pressures chemical reactivity and diffusion for many elements is not seriously retarded and in some cases appears to be enhanced. At the same time, it has been shown by earlier research (e.g., Bridgman), and also observed during the course of this work, that the temperature of transformation to graphite at measurable rates can be significantly depressed by subjecting diamond to high hydrostatic pressures; for example, to the order of 30,000 atmospheres or higher. It has been found, that subjecting diamond first to high hydrostatic or quasi-hydrostatic pressures, thereupon heating diamond to sufficiently high temperatures as to initiate specifically desired chemical reaction and diffusion of foreign atoms but insufficient to cause noticeable transformation to graphite, followed by cooling to room temperature, and finally reducing pressure to normal, that certain elements can be injected or diffused into diamond in sufficient concentration to serve as carriers to provide semiconducting characteristics. In summary, it has been found possible to thermally introduce selected impurity atoms into diamond through control of elevated pressures, elevated temperatures, time, the chemical composition and concentration of the impurity environment.

It also has been found possible to introduce controlled chemical contamination (semiconducting carriers) into otherwise chemically pure synthetic diamond during initial growth, based on principles set forth in the first part of this disclosure. The secondary process of carrying out diffusion after diamond growth, however, is believed to be preferable since greater control of the impurity concentration appears possible.

Tests have been conducted with the following semiconductor impurities: nitrogen, lithium, boron, sulfur, nickel, aluminum, phosphorus, cobalt, gallium, arsenic. Boron, nitrogen and aluminum appear to provide the most promising results for controlled semiconductivity in diamond, although others may be found to be superior.

Analytical techniques used to evaluate results are the following: optical transmission, emission spectroscopy, X-ray diffraction and fluorescence.

Some specific examples used to explore controlled diffusion of carriers into otherwise high purity diamond in accordance with our invention are given below. These examples are illustrative of the practice of our invention; and are not intended to be limiting.

Apparatus used to carry out the process was high temperature and high pressure equipment disclosed in Patent No. 2,995,776 issued to the inventors of the instant invention, although other suitable apparatus could be employed, provided that the essential conditions could be produced and properly controlled.

*Example 1*

A mixture or sequence of pure manganese, pure carbon and pure aluminum chloride in a weight ratio of 1:1:0.01, respectively, was subjected to approximately 70,000 atmospheres of pressure and heated to approximately 1500° C. for several minutes, then cooled to room temperature, followed by reduction of pressure to normal.

*Example 2*

A mixture or sequence of pure manganese, pure carbon and pure nickel or nickel chloride in a weight ratio of 1:1:0.05, respectively, was subjected to the same approximate pressure-temperature sequence set forth above.

*Example 3*

A mixture or strata of pure iron, pure carbon and pure iron sulfide was subjected to the same sequence and approximate intensities specified in Example 1.

*Example 4*

A mixture or sequence of pure manganese, pure carbon and aluminum boride in a weight ratio of 1:1:0.01 was subjected to similar conditions as set forth in Example 1.

*Example 5*

A mixture or sequence of pure manganese, pure carbon and gallium arsenide in a weight ratio of 1:1:0.01 was subjected to conditions similar to those set forth in Example 1.

*Example 6*

Synthetic diamond of high chemical purity was packed in an environment of pure graphite contaminated with controlled amounts of ammonium chloride, subjected to pressures of about 50,000 atmospheres, heated to about 1500° C., cooled to room temperature, then the pressure lowered to normal.

*Example 7*

The same procedure but using a contaminant of ammonium hydrogen phosphate.

*Example 8*

Same but using sodium borate.

*Example 9*

Same but using boron or boron carbide.

*Example 10*

Same but using phosphorous.

*Example 11*

Same but using aluminum or aluminum chloride.

*Example 12*

Same but using lithium nitride.

As previously mentioned, all work described herein has been conducted in the high pressure-high temperature apparatus described by U.S. Patent No. 2,995,776, Giardini and Tydings. Pressures referred to have been determined on the basis of electrical resistance measurements on pure bismuth, thallium, barium and manganin alloy as a function of pressure according to the most recent values in the literature. Temperatures have been measured by use of platinum-platinum (13% rhodium) thermocouples and the pressure-corrected melting points of pure gold, nickel and platinum.

We claim:

1. The method of producing semiconducting diamond comprising: packing synthetic diamond of high chemical purity into an environment of substantially pure graphite in a pressure vessel, said graphite being mixed with a carrier impurity source substance from the group consisting of ammonium chloride, ammonium hydrogen phosphate, phosphorus, and lithium nitride; subjecting the contents of said pressure vessel to a pressure of about 50,000 atmospheres; heating said diamond with its environment mixture to about 1500° C.; cooling the contents of said pressure vessel to room temperature; then lowering the pressure to normal.

2. The method of claim 1 in which the carrier impurity source substance is ammonium hydrogen phosphate.

3. The method of claim 1 in which the carrier impurity source substance is phosphorus.

4. The method of claim 1 in which the carrier impurity source subtsance is lithium nitride.

References Cited by the Examiner

UNITED STATES PATENTS

| | | |
|---|---|---|
| 2,947,610 | 8/1960 | Hall et al. |
| 2,992,900 | 7/1961 | Bovenkerk. |
| 3,134,739 | 5/1964 | Cannon _____ 252—503 |
| 3,141,855 | 7/1964 | Wentorf _____ 252—502 |
| 3,148,161 | 9/1964 | Wentorf et al. _____ 252—502 |

LEON D. ROSDOL, *Primary Examiner.*

JULIUS GREENWALD, *Examiner.*

R. D. LOVERING, *Assistant Examiner.*